United States Patent [19]
Watanabe et al.

[11] Patent Number: 5,572,724
[45] Date of Patent: Nov. 5, 1996

[54] SYSTEM FOR CONTROLLING COMMUNICATIONS BETWEEN AN APPLICATION AND A REMOTE SYSTEM USING A PROTOCOL IDENTIFIER AND AN APPLICATION CONTEXT IDENTIFIER

[75] Inventors: Tetsuya Watanabe, Yokohama; Hiromichi Ishikawa, Fujisawa; Masaaki Hatano, Osaka, all of Japan

[73] Assignees: Hitachi, Ltd., Tokyo; Hitachi Seibu Software Co., Ltd., Osaka, both of Japan

[21] Appl. No.: 133,852

[22] Filed: Oct. 12, 1993

[30] Foreign Application Priority Data

Oct. 12, 1992 [JP] Japan .................................. 4-272668

[51] Int. Cl.$^6$ ..................................... G06F 17/30
[52] U.S. Cl. ..................... 395/616; 364/DIG. 1; 364/284.4
[58] Field of Search ................................. 395/600

[56] References Cited

U.S. PATENT DOCUMENTS

| | | | |
|---|---|---|---|
| 5,058,000 | 10/1991 | Cox et al. | 395/600 |
| 5,179,660 | 1/1993 | Devaney et al. | 395/200 |
| 5,257,366 | 10/1993 | Adair et al. | 395/600 |
| 5,278,978 | 1/1994 | Demers et al. | 395/600 |
| 5,317,568 | 5/1994 | Bixby et al. | 370/85.6 |
| 5,329,619 | 7/1994 | Pag''et al. | 395/200 |
| 5,381,534 | 1/1995 | Shi | 395/200 |
| 5,384,829 | 1/1995 | Heileman, Jr. et al. | 379/67 |
| 5,414,812 | 5/1995 | Filep et al. | 395/200 |
| 5,440,744 | 8/1995 | Jacobson et al. | 395/650 |
| 5,442,791 | 8/1995 | Wrabetz et al. | 395/650 |

*Primary Examiner*—Wayne Amsbury
*Attorney, Agent, or Firm*—Antonelli, Terry, Stout & Kraus

[57] ABSTRACT

In a distributed system having a plurality of interconnected computer systems each having an application program, a process manager which determines the need for a communication process, determines an identifier of a destination system and a protocol and issues a communication process request in response to a process request for database access from the application program, and a virtual communication user for determining an application context in response to the communication process request from the process manager are provided, and a communication path a protocol machine establishes for the virtual communication user. A plurality of virtual communication users for managing the communication process are provided and each virtual communication user manages a plurality of protocol machines so that a plurality of protocols and application programs are simultaneously used for a plurality of destination systems from one application program.

16 Claims, 7 Drawing Sheets

| TABLE NAME | IDENTIFIER OF DESTINATION SYSTEM |
|---|---|
| TABLE 1 | N 1 |
| TABLE 2 | N 0 |
| TABLE 3 | N 2 |

| IDENTIFIER OF DESTINATION SYSTEM | IDENTIFIER OF PROTOCOL |
|---|---|
| N 1 | RDA |
| N 2 | RDA |
| N 2 | RPC |
| N 3 | RDA |

FIG. 5

```
DECLARE CR1 CURSOR                        } 501
    FOR SELECT C1, C2 FROM TABLE1

DECLARE CR2 CURSOR                        } 502
    FOR SELECT C3, C4 FROM TABLE2
          .
          .
          .

OPEN CR1                                  } 503

FETCH CR1 INTO DATA1, DATA2               } 504

RPC-CALL SUPRC1 (DATA1, DATA2,
                                          } 505
      DATA3, DATA4) NODE (N2)

OPEN CR2                                  } 506

FETCH CR2 INTO DATA3, DATA4               } 507
```

FIG. 6

| TABLE NAME | IDENTIFIER OF DESTINATION SYSTEM |
|---|---|
| TABLE 1 | N 1 |
| TABLE 2 | N 0 |
| TABLE 3 | N 2 |

FIG. 7

| IDENTIFIER OF DESTINATION SYSTEM | IDENTIFIER OF PROTOCOL |
|---|---|
| N 1 | RDA |
| N 2 | RDA |
| N 2 | RPC |
| N 3 | RDA |

SYSTEM FOR CONTROLLING COMMUNICATIONS BETWEEN AN APPLICATION AND A REMOTE SYSTEM USING A PROTOCOL IDENTIFIER AND AN APPLICATION CONTEXT IDENTIFIER

BACKGROUND OF THE INVENTION

Field of the Invention

The present invention relates to a method for controlling a plurality of protocols and a plurality of application contexts in a distributed system connected through a communication network, and more particularly to a method for efficiently establishing a connecting line from a user application to a plurality of distributed database systems.

When a communication path is to be established from a system which executes a user application to distributed databases, it is performed by using a predetermined protocol. Detailed specification of the protocol is defined by an application context. The application context is defined by a standard such as ISO and a communication path may not be established if the application context does not match even if the protocol matches.

In the past, in establishing a communication path from a system which executes an application program, communication with a destination system may be done by the application program which uses an already established logical communication path by communication path allocating means, as disclosed in JP-A-4-23155. Since the number of times of establishment/release of the communication path by communicating with the destination system by using the already established communication path, a communication fee in a packet transmission system can be reduced.

In the prior art, the communication path, the communication protocol to be used and the application context are preestablished, and no attention is paid for the use of a plurality of protocols or application contexts by one application program.

When the application program uses a plurality of protocols or application contexts, it is necessary to program by the application program to permit the use of a plurality of communication control programs but it is not easy to modify the protocols and the application contexts.

SUMMARY OF THE INVENTION

It is an object of the present invention to provide a method for controlling a plurality of protocols and application contexts in distributed systems to realize the easy establishment of the communication path to a destination system by using a plurality of protocols and application contexts from an application program.

It is another object of the present invention to provide a method for establishing a communication path to a destination system without need for an application program to recognize the detail of the protocol and the application context of the destination system.

In order to achieve the above objects, in accordance with the distributed system of the present invention, a requesting system (client system) which executes the application program is configured as follows.

A process manager is provided as means for controlling a process for indicating an operation (start, end, transaction, etc.) of the application program, and of the processes of the application program, a communication process (start/end of communication, start/end of transaction to a server, etc.) of a remote database access is recognized. The process manager determines the connection form and the protocol to be used for the communication format and the destination system designated by the application. The process manager connects a plurality of virtual communication users, which recognize the application context for the protocol designated by the process manager. A plurality of protocol machines are connected to the virtual communication users. One protocol machine is provided for each virtual communication path. By the term "virtual communication path" is meant a communication path virtualized by classifying a real communication path by the protocols and application contexts used.

Through interaction of the above means, the application program can execute the plurality of communication processes using the plurality of protocols by using the plurality of virtual communication users through the process manager. Further, since the plurality of communication processes which use the plurality of application contexts using the plurality of protocol machines controlled by the virtual communication users are provided, a plurality of communications of different natures or different purposes can be concurrently executed to a plurality of destinations.

BRIEF DESCRIPTION OF THE DRAWINGS

FIG. 5 shows an example of description of an application program, FIG. 6 shows a table of a table name versus all identifier of a destination system, FIG. 7 shows a table of the identifier of the destination system.

DETAILED DESCRIPTION OF THE PREFERRED EMBODIMENTS

One embodiment of the present invention is now explained in detail with reference to the drawings.

Figure 4:
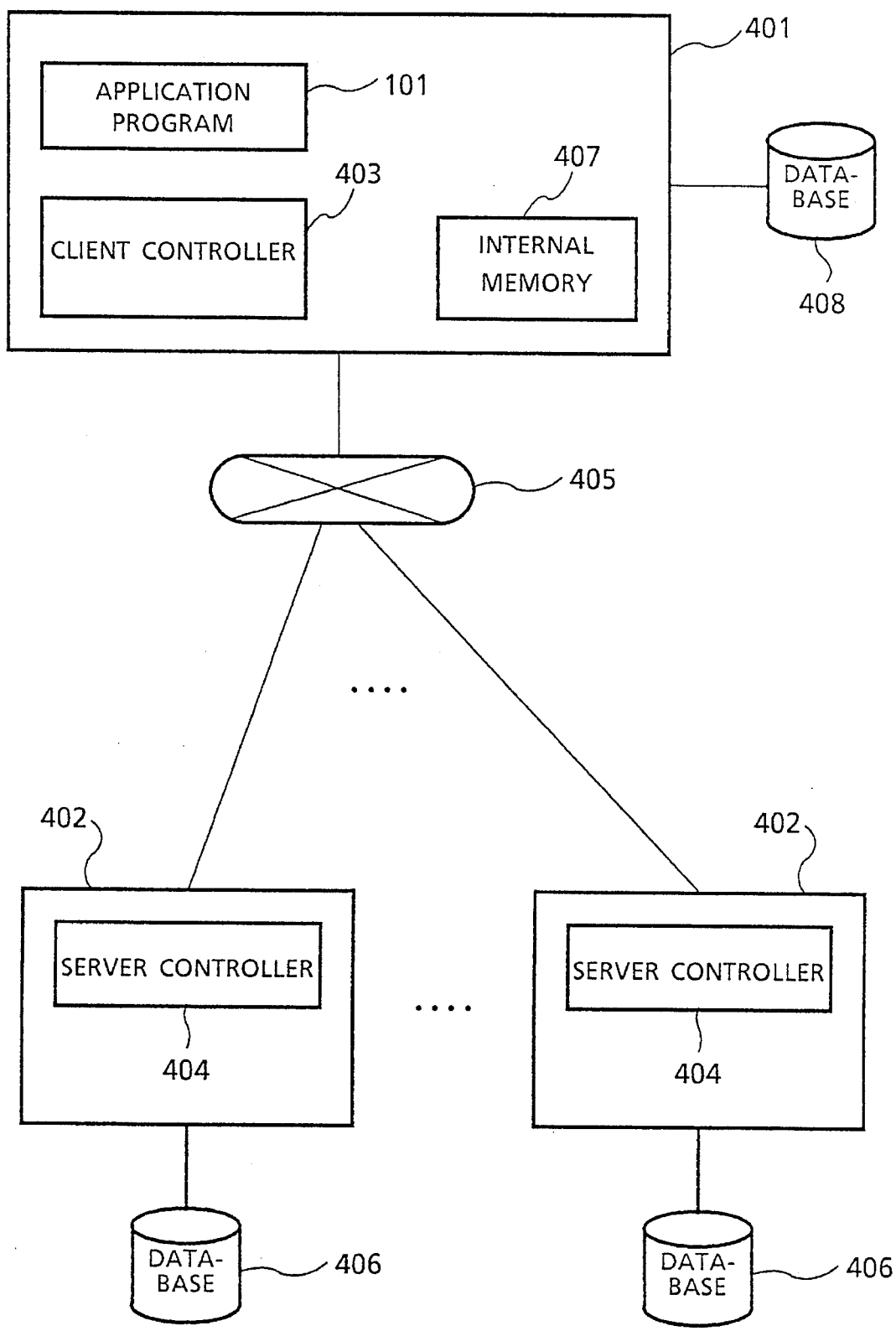
FIG. 4 shows a system configuration of a distributed system in accordance with the present invention.

FIG. 4 shows an overall configuration of a distributed system for realizing the present invention. A client system 401 on a client station and a server system 402 are interconnected through a communication network 405.

Connected to the client system 401 are an application program 101 to be used by a user, a client controller for controlling the execution of the application program, an internal memory 407, and a database 408. The internal memory 407 stores a table of a table name versus an identifier of a destination system as shown in FIG. 6 and a table of the identifier of the destination system versus an identifier of a corresponding protocol as shown in FIG. 7, which will be described later.

The server system 402 has a server controller 404 to which a database 406 is connected. Various databases 406 may be applicable. For example, it may be a relational database.

Figure 1:
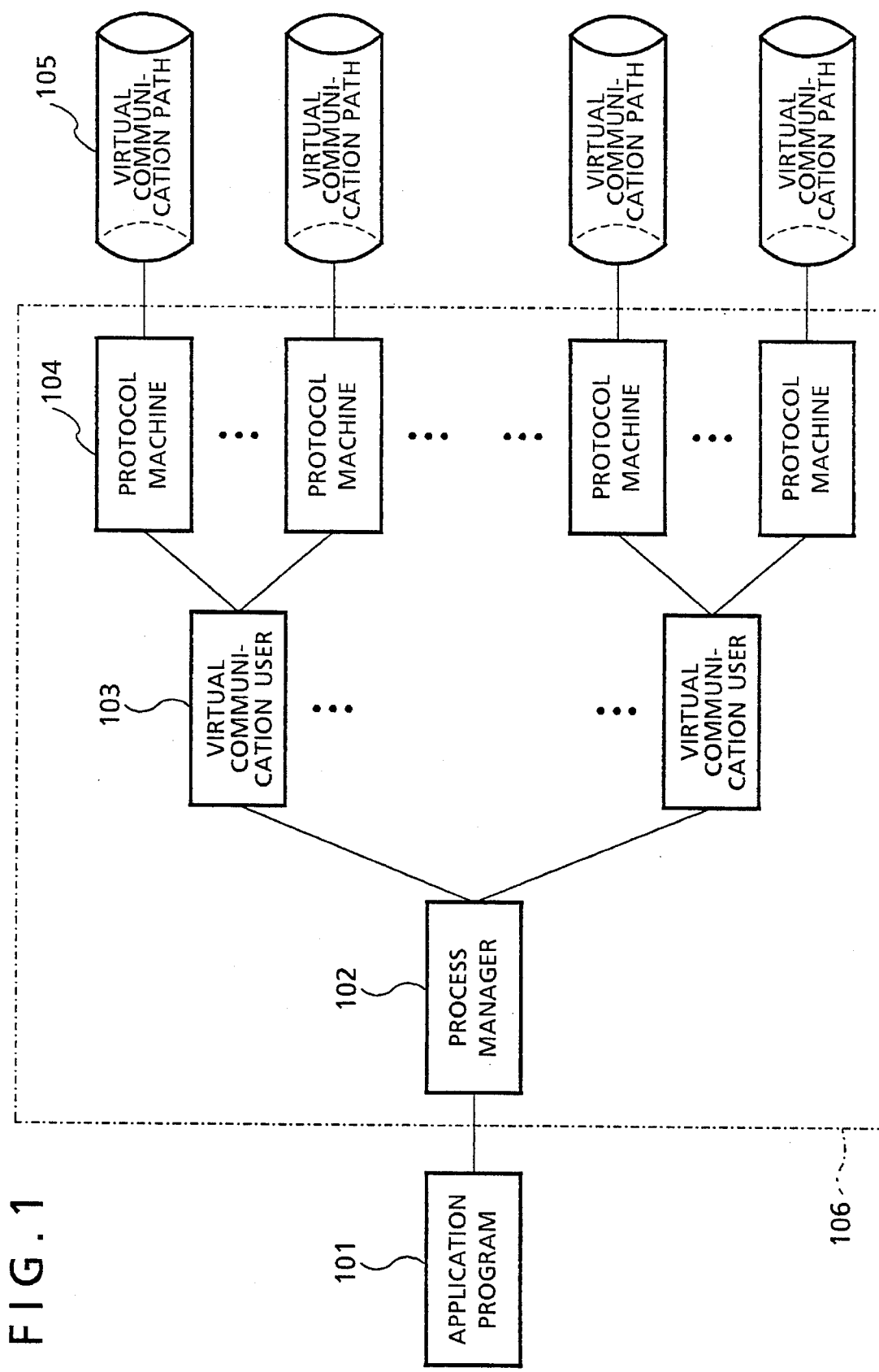
FIG. 1 shows a conceptual view of an embodiment of the present invention.

FIG. 1 conceptually shows an embodiment of the present invention.

An application program 101 is a user program which may execute a business application and it commands an access to the server system 402. The access is made by directly or indirectly designating a protocol and an application context. By directly, it is meant that an identifier identifying the types of the protocol and the application context is described in the application program, and by indirectly, it is meant that an identifier of the destination system is described and a program other than the application program or control means determines the protocol and the application context by using the directory information based on the identifier.

An example of the description of the application program 101 is explained with reference to FIG. 5. In the present example, a major part thereof is described by SQL (structured query language) which is a database language of ISO/IEC 9075 protocol. Written in the application program 101 are statements 501 and 502 for accessing a table located in the database 406 of the server system 402, a statement for executing a remote procedure call, and statements 503 and 506 for opening a table located in the database in the client system. The statement 501 declares a cursor for accessing data and it is a command for generating a cursor to columns C1 and C2 from a table 1. This declaration is indirect designation for designating TABLE which is to be accessed in the destination system without specifying the destination system. The statement 502 is same as the statements 501. The statements 503 and 506 are commands to open cursors CR1 and CR2. The statement 504 is a command to get data from a location designated by CR1 and substitute it for data 1 and data 2. The statement 502 is same as the statement 504.

The statement 505 is a command to call a remote procedure. It is written not by SQL but by a description form which directly designates a node of a called station. In the present example, it represents that the station to be called is a node N2 and an argument is DATA 1-DATA 4.

Turning back to FIG. 1, the process manager 102 is a program which controls the operation (start, end, transaction, etc.) of the application program 101, and it controls to connect to the database 406 during the execution (run time) of the process of the application such as a database management system (DBMS) or an on-line transaction management program. Specifically, it recognizes the command designated by the application program 101, recognizes the protocol of the destination system and selects the virtual communication user 103 corresponding to the protocol. The virtual communication program 103 may be selected by a command described in the application program 101. The virtual communication user 103 may be uniquely determined by the destination system or it may be determined in accordance with the type of protocol.

The virtual communication user 103 is a program which controls the communication process (start/end of communication, start/end of transaction to the destination system, etc.) such as access to a remote database contained in the process, and it functions as a virtual user program to the protocol machine 104. The virtual communication user 103 centrally controls the communication designated by the process manager, recognizes the application context to be used for the protocol, and selects the protocol machine 104 corresponding to the application context. The protocol machine 104 may be uniquely determined by the destination system or it may be determined in accordance with the type of application context.

The protocol machine 104 is a program which controls the establishment of a communication path by using the determined protocol and application context. For the process of a plurality of protocol machines 104, a table is allotted for each protocol machine and the information on the destination system and the information on the application context of the communication protocol under use are managed for each table so that the communication is executed by using different application contexts.

The communication path 105 is a virtual communication path, and in a real communication path, it is virtualized for each protocol and application context to be used.

A section 106 encircled by broken lines and including the process manger 102, the virtual communication user 103 and the protocol machine 104 may be implemented by software in the client controller 403 shown in FIG. 4.

Figure 2:
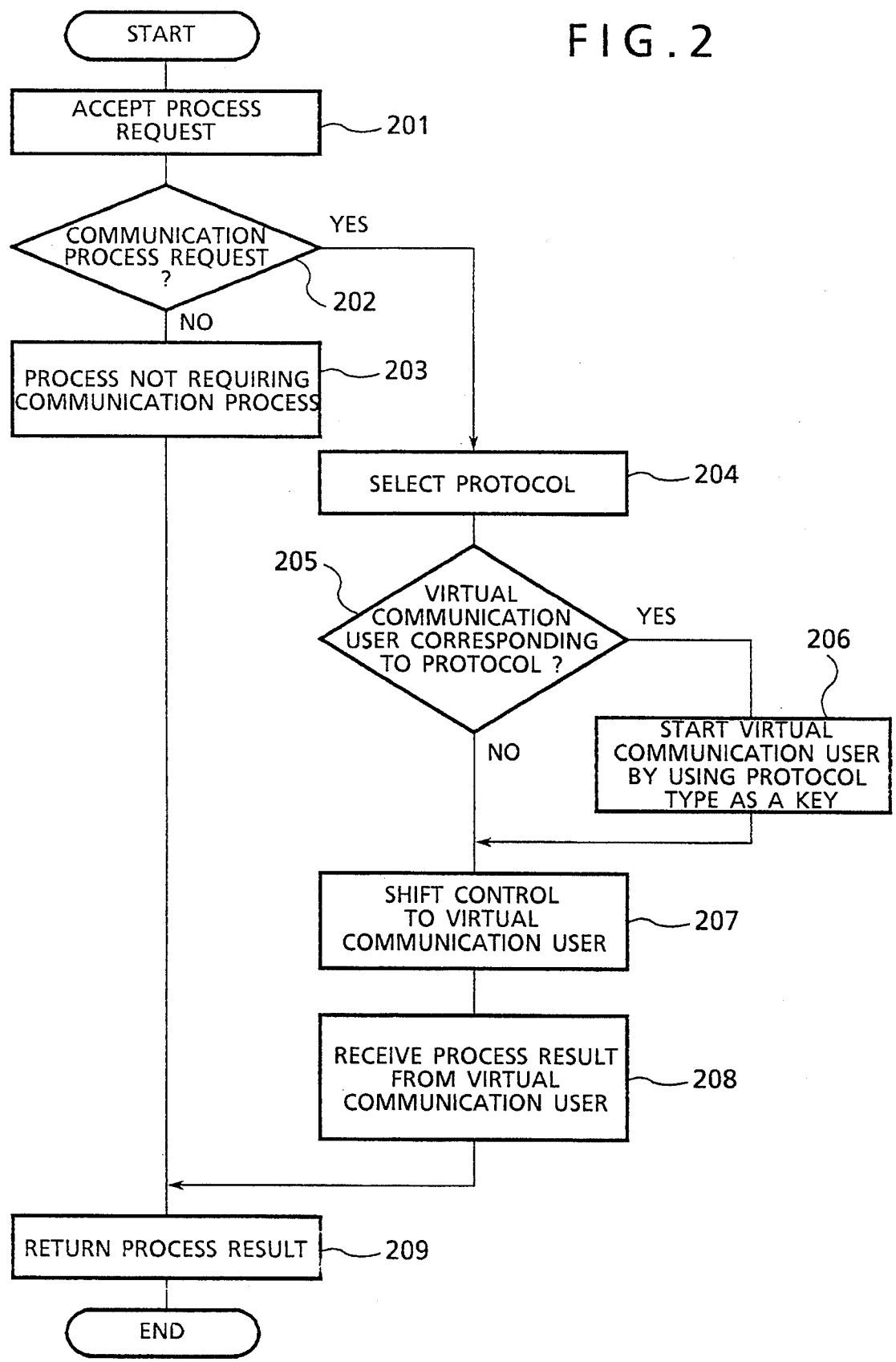
FIG. 2 shows a flow chart of a virtual communication user call process of a process manager.

A flow of a call process of the virtual communication user 103 of the process manager 102 is now explained with reference to FIG. 2.

When a statement 501 for accessing the table located in the database 406 is executed, the process manager 102 receives a process request of the statement (step 201). It analyzes the statement and determines whether the process requires a communication process or not by using a table of a table name versus a destination system shown in FIG. 6 stored in the internal memory 407 by using the table name (TABLE 1) as a key. An identifier (N1) of the destination system is derived based on the table name (step 202). In the process which does not require the communication process such as the access to the database 408, the requested process is executed (step 203).

Then, an identifier (RDA) of the protocol is derived from the table of the identifier of the destination system versus the protocol identifier shown in FIG. 7 based on the identifier (N1) of the destination system (step 204). In the protocol identifier in FIG. 7 RDA and RPC respectively denote remote database access and remote procedure call in open systems interconnection prescribed in the ISO/IEC 9579 and the ISO/IEC CD 7347 protocols. The process manager 102 determines whether the protocol for accessing the database is the protocol corresponding to the virtual communication user 103 in use or not. If the virtual communication user corresponding to that protocol has not yet been started, one virtual communication user is selected and started (step 206), and if it has been started, the communication process is requested to that virtual communication user 103 (step 207). In this manner, the process manager 102 shifts the control to the virtual communication user 103, and when a series of steps are thereafter completed, it receives the process result from the virtual communication user (step 208) and returns the process result to the application program 101 (step 209).

Figure 3:
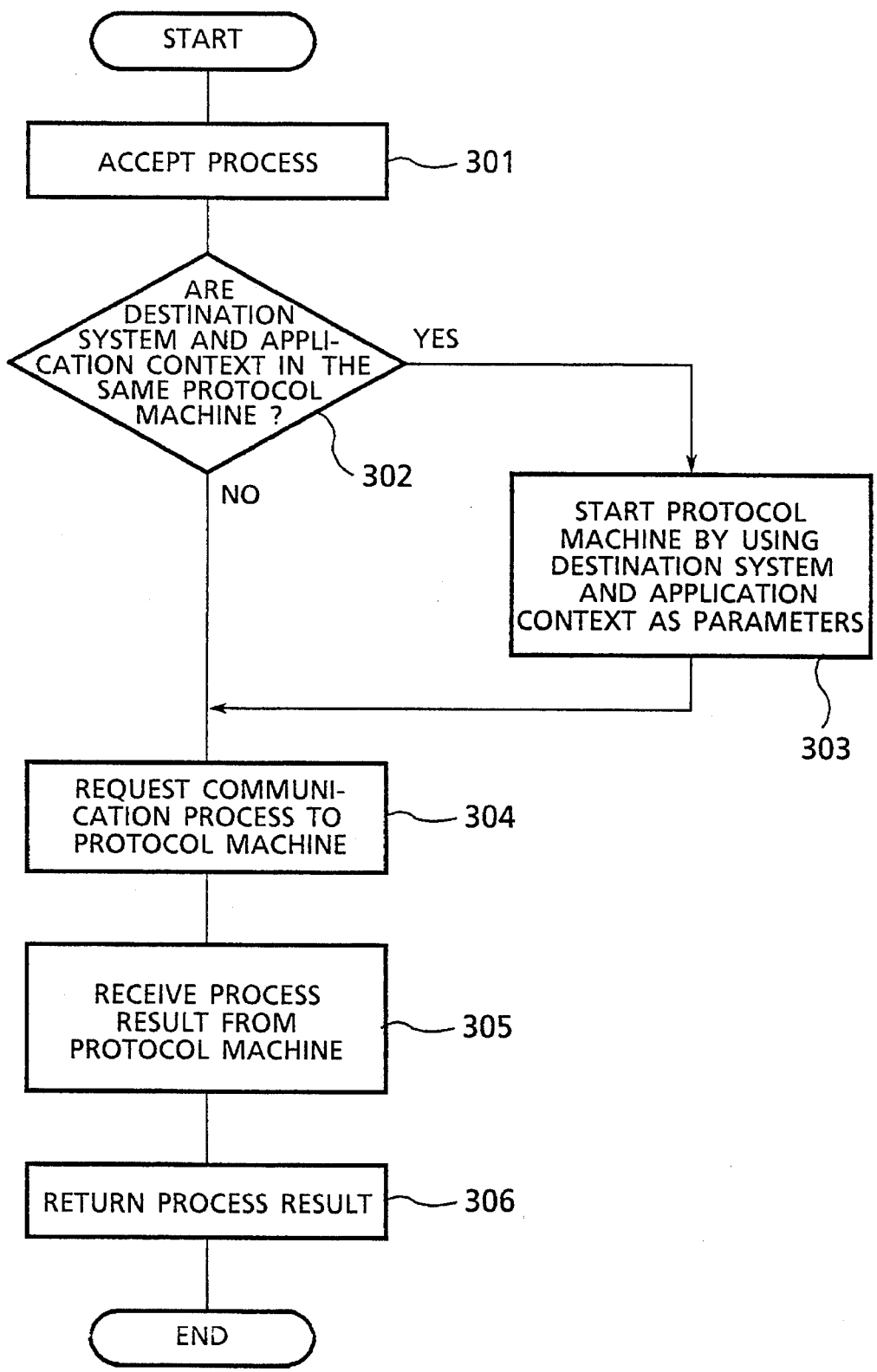
FIG. 3 shows a flow chart of a communication process of a virtual communication user.

A flow of a process of the virtual communication user 103 is now explained with reference to FIG. 3.

When the virtual communication user 103 receives the process request from the process manager 102, it analyzes the content to specify the type of application context and the destination system (step 301). The application context may be selected by retaining in a table the information on the destination system and the information on the application context of the communication protocol to be used for each process of the protocol machine 104 and selecting a basic application context of the RDA or a TP (OSI distributed Transaction Processing protocol in ISO/IEC 1002 6-3) application context based on the management level of a transaction of the destination system and the process content (update or non-update) of the application program. Then, it determines whether the connection with the destination system is under process or not based on the identifier identifying the type of the specified application context and the identifier identifying the destination system, that is, it determines whether the protocol machine which is being connected with the destination system is present or not based on the application context (step 302). If the connection with the destination system is not yet established, that is, if the protocol machine 104 has not yet been started, one protocol machine 104 is started by using the identifier of the destination system and the identifier of the application context as the parameters (step 303).

A communication request is issued to the protocol machine 104 (step 304). The protocol machine 104 establishes the communication path, execute a series of communication processes and returns the process result to the virtual communication user 103, which receives the process result (step 305) and returns the process result to the process manager 102 (step 306).

In this manner, the statement 501 of the application program 101 is executed. An operation when the statement 505 (RPC-CALL) is executed is now explained. The process manager 102 analyzes the process statement 505, takes out the identifier (N2) identifying the destination system, and starts the virtual communication user 103 for the RPC by using the table of FIG. 7 based on the identifier. The virtual communication user 103 for the RPC executes the communication process by using the RPC protocol machine 104. Where the direct designation is made such as by the statement 505, it is not necessary to use the table of FIG. 6.

Figure 8:
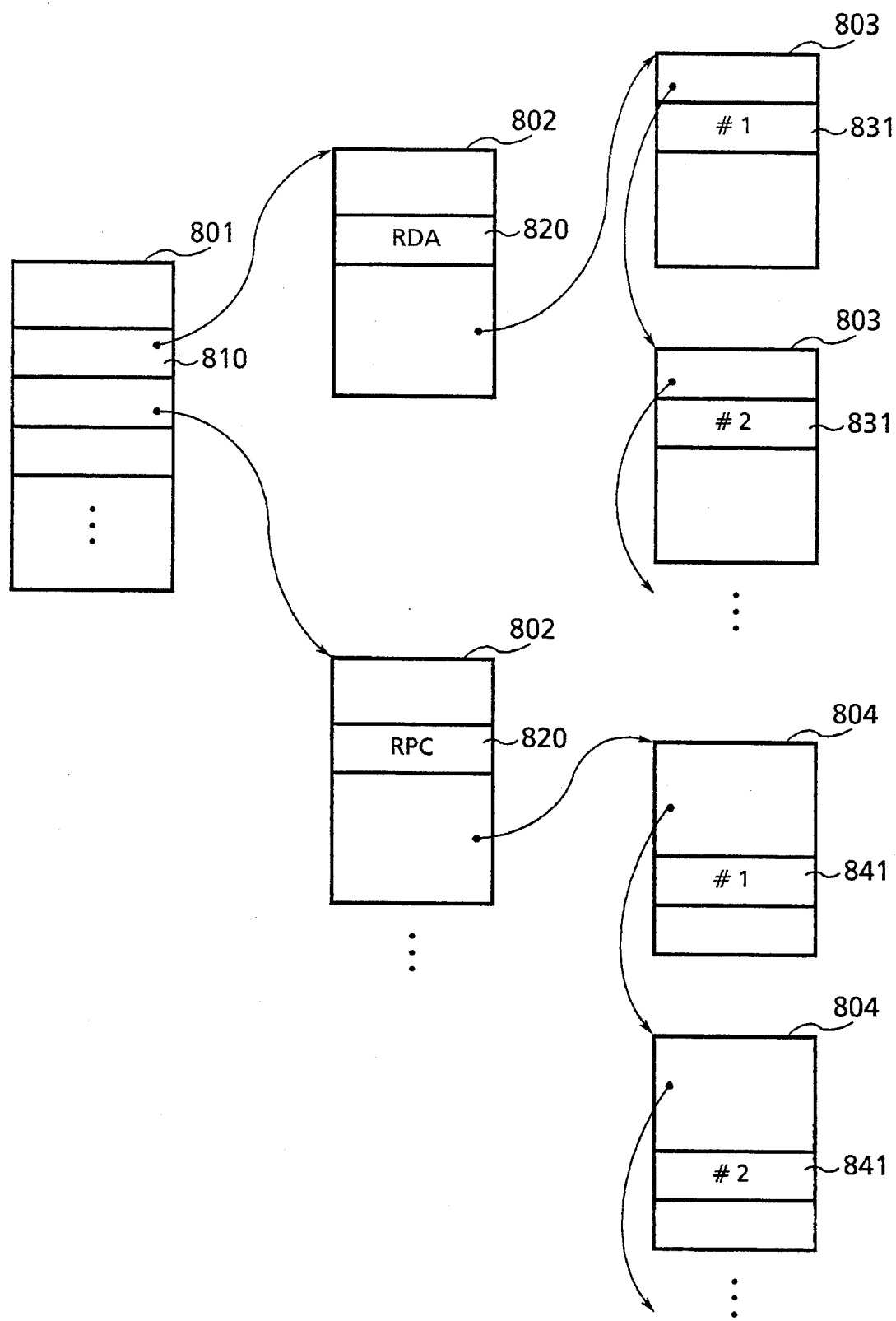
FIG. 8 shows a relation to a management table.

A relation between the management tables for the process manager 102, the virtual communication user 103 and the protocol machine 104 is explained with reference to FIG. 8, in which arrows show the relations between the tables. The management tables may be stored in the internal memory 407.

The management table 801 of process manager 102, the management table 802 of the virtual communication user and the management table 804 of the protocol machine 104 have a hierarchy relation.

Chaining to the corresponding management table 802 is made by the handling 810 of the virtual communication user 103 stored in the management table 801 to the management table 802, and the chaining to the management tables 803 and 804 is made by the stored protocol identifier 820 (RDA, RPC). The application contexts 831 and 841 are stored in the management tables 803 and 804, respectively.

In the above embodiment, the process manager 102 sequentially and time-serially processes the process requests of the application program 101 and sequentially uses the virtual communication users 103. Alternatively, a plurality of virtual communication users 103 may be parallelly controlled to improve the performance of the distributed system.

In the above embodiment, the protocol is selected by the process manager 102 and the application context is determined by the virtual communication user 103. Alternatively, they may be directly described in the application program as the identifiers identifying themselves and commanded to the virtual communication user 103 and the protocol machine 104 by using the parameters.

In accordance with the present invention, in the requesting station (client system) which controls the application program in the distributed system such as a client-server system, the application program may execute jobs without recognizing the communication protocol and the application context, and the simultaneous communication from one application program may be realized by using a plurality of protocols and a plurality of application contexts. Namely, the distributed system may be structured without restriction by the type and function of the destination system and without regard to the type of the computer system.

What is claimed is:

1. A method for establishing a communications link between at least one pair of computer systems within a distributed system, which includes a plurality of computer systems interconnected to one another along a communications network, said method comprising the steps of:

executing an applications program within a source system to extract therefrom destination information identifying a destination system;

determining a protocol identifier based on the destination information derived from execution of said applications program;

determining an application context identifier based on said protocol identifier;

completing a communications path between the source and destination systems based on said protocol and application context identifiers.

2. The method recited in claim 1, further comprising the steps of:

extracting from said destination information a table name;

finding said table name within a first set of table data stored in a memory of said source system, said first set of table data plotting a row of table names against a corresponding row of computer system identifiers;

selecting a computer system identifier which corresponds to said table name; and identifying the destination system as the system identified by said computer system identifier.

3. The method recited in claim 2, further comprising the steps of:

finding the computer system identifier in a second set of table data stored within said source system memory, said second set of table data plotting a row of computer system identifiers against a corresponding row of protocol identifiers; and determining said protocol identifier as a protocol identifier which corresponds to the computer system identifier in said second set of table data.

4. A method for establishing a communications link between an applications program and one or more destination systems within a distributed system, said applications program and said destination systems being interconnected along a communications network, said method comprising the steps of:

executing an applications program to extract therefrom destination data for identifying a specific destination system;

determining a protocol identifier based on said destination data derived from the execution of said applications program;

determining an application context identifier based on said protocol identifier;

completing a communications link between the applications program and said specific destination system based on said protocol and application context identifiers.

5. A distributed system having a plurality of interconnected computer systems each having a database connected thereto, comprising:

a first table having information indicating a relationship between a table name, designated at a time of issuance of an access process request from an application program being executed by one of said plurality of interconnected computer systems, and a destination system;

a second table having information indicating a relationship between said designation system and a protocol identifier;

first means, responsive to said access process request, for issuing a communication process request for communication, using a protocol identified by said protocol identifier indicated by said second table, with said destination system indicated by said first table;

second means, responsive to said communication process request from said first means, for recognizing an application context identifier based on said communication process request and adding said application context identifier to said communication process request; and third means, responsive to said communication process request from said second means, for establishing a communication path between said application program at said destination system and executing a communication process based on said protocol;

said application program through said first and second tables designates said destination system and said protocol identifier to said first means, while said first, second, and third means jointly establish said communication path based on said protocol and application context identifiers and execute said communication process.

6. A method for controlling a plurality of protocols and a plurality of application contexts in a distributed system having a plurality of interconnected computer systems each having a database connected thereto, comprising the steps of:

registering in a first table information indicating a relationship between a table name, designated at a time of issuance of a process request for access to said database from an application program being executed by one of said plurality of interconnected computer systems, and a row of destination systems;

determining a destination system identifier for the destination system by looking up the table name in said first table designated by said application program;

registering in a second table information indicative of a relationship between said destination system identifier and a protocol identifier;

issuing a communication process request for communication using a protocol identified by said protocol identifier indicated by said second table;

determining an application context identifier based on said communication process request;

adding said application context identifier to said communication process request; and establishing a communication path between said application program and said destination system based on said protocol and application context identifiers.

7. A distributed system including a plurality of computer systems interconnected along a communications network, provided to support communications between at least one pair of said computer systems, said distributed system comprising:

a source system, which may be any one of said plurality of computer systems, said source system including an application program which, when executed by said source system, provides a communication request for communication with a destination system and destination data for identifying said destination system, which may be any other one of said plurality of computer systems; and a control system for establishing a communication path between the application program of said source system and. said destination system, said control system including:

a first means for selecting a protocol identifier for said destination system based on said destination data provided by said application program, a second means for determining an application context identifier based on said communication request, and a third means, selected in accordance with said application context identifier, for establishing said communication path between the source and destination systems and executing a communication process based on a protocol identified by said protocol identifier.

8. The system of claim 7, wherein said source system further includes a memory for storing a first set of table data containing a row of table names plotted against a corresponding row of computer system identifiers, said destination data, provided upon execution of said application program, being associated with one of said table names in said first set of table data, said destination system being identified as a computer system corresponding to the table name associated with said destination data in said first set of table data.

9. The system of claim 8, wherein said memory further includes a second set of table data containing a row of destination systems plotted against a corresponding row of protocol identifiers, said first means selecting a protocol identifier from said second set of table data based on the destination system selected from said first set of table data.

10. A distributed system including a plurality of computer systems interconnected to one another along a communications network, provided to support communications between at least one pair of said computer systems, said distributed system comprising:

a source system, which may be any one of said plurality of computer systems, said source system including an application program which, when executed by said source system, provides a communication process request for communication with a destination system and destination data for identifying said destination system, which may be any other one of said plurality of computer systems; and a control system for establishing a communications path between the applications program of said source system and said destination system, said control system including:

a process manager for receiving said destination data and for determining a protocol identifier corresponding to the destination system identified by said destination data, a virtual communication user, connected to said process manager, for determining an application context identifier based on said communication process request; and a protocol machine, connected to said virtual communications user and selected in accordance with said application context identifier, for completing the communications path between the source and destination systems based on said protocol and application context identifiers.

11. The system of claim 10, wherein said source system further includes a memory for storing a first set of table data containing a row of table names plotted against a corresponding row of computer systems identifiers, said destination data provided upon execution of said application program being associated with one of said table names in said first set of table data, said destination system being identified as a computer system corresponding to the table name associated with said destination data in said first set of table data.

12. The system of claim 10, wherein said memory further includes a second set of table data containing a row of destination systems plotted against a corresponding row of protocol identifiers, said process manager selecting a protocol identifier from said second set of table data based on the destination system selected from said first set of table data.

13. A computer program product for use with a computer having a display device, comprising:

a computer readable medium with a computer program recorded thereon, the program including:
- (a) a first code section for causing the computer to execute an application program from which an access process request is issued, said access process request designating a table name,
- (b) a second code section for causing the computer to look up the table name in a table having information indicating a relationship between the table name and a destinations system,
- (c) a third code section for causing the computer to look up said destination system in a second table having information indicating a relationship between the designation system and a protocol identifier,
- (d) a fourth code section for causing the computer to issue, in response to said access process request, a communication process request for communication, using a protocol identified by said protocol identifier indicated by said second table, with said destination system indicated by said first table,
- (e) a fifth code section for causing the computer to recognize, in response to said communication process request, an application context identifier based on said communication process request,
- (f) a sixth code section for causing the computer to add said application context identifier to said communication process request, and
- (g) a seventh code section for causing the computer to establish, in response to said communication process request, a communication path between said application program at said destination system based on said protocol and application context identifiers, and
- (h) an eighth code section for causing the computer to execute a communication process based on said protocol.

14. A computer program product for use with a computer having a display device, comprising:

a compute readable medium with a computer program recorded thereon, the computer including:
- (a) a first code section for causing the computer to execute an application program from which a process request for access to a data base is issued, said process request designating a table name,
- (b) a second code section for causing the computer to look up table name in a first table containing information indicating a relationship between said table name and a destination system,
- (c) a third code section for causing the computer to determine a destination system identifier for the destination system determined from said first table,
- (d) a fourth code section for causing the computer to look up said destination system identifier in a second table containing information indicative of a relationship between said destination system identifier and a protocol identifier,
- (e) a fifth code section for causing the computer to issue a communication process request for communication using a protocol identified by said protocol identifier indicated by said second table,
- (f) a sixth code section for causing the computer to determine an application context identifier based on said communication process request,
- (g) a seventh code section for causing the computer to add said application context identifier to said communication process request,
- (h) an eighth code section for causing the computer to establish a communication path between said application program and said destination system based on said protocol and application context identifiers.

15. A computer program product for use with a computer having a display device, comprising:

a computer readable medium with a computer program recorded thereon, the program including:
- (a) a first code section for causing the computer to execute an application program to provide a communication process request for communication with a destination system and destination data for identifying said destination system,
- (b) a second code section for causing the computer to select a protocol identifier for said destination system based on said destination data provided by said application program,
- (c) a third code section for causing the computer to determine an application context identifier based on said communication process request,
- (d) a fourth codes section for causing the computer to establish a communication path between a source system and the destination system, and executing a communication process based on a protocol identified by said protocol identifier and said application context identifier.

16. A computer program product for use with a computer having a display device, comprising:

a computer readable medium with a computer program recorded thereon, the program including:
- (a) a first code section for causing the computer to execute an application program containing destination data for identifying a destination system,
- (b) a second code section for causing the computer to determine a protocol identifier corresponding to the destination system identified by said destination data,
- (c) a third code section for causing the computer to determine an application context identifier based on a communication process request issued during execution of said application program,
- (d) a fourth code section for causing the computer to complete a communication path between a source system and a destination system based on said protocol and application context identifiers.

* * * * *